United States Patent [19]

Nishibe et al.

[11] Patent Number: 4,847,483

[45] Date of Patent: Jul. 11, 1989

[54] DEVICE FOR MEASURING LIGHT INTENSITY RECEIVED BY A PHOTOSENSOR

[75] Inventors: Takashi Nishibe; Shotaro Yokoyama, both of Kanagawa, Japan

[73] Assignee: Fuji Electric Co., Ltd., Kanagawa, Japan

[21] Appl. No.: 137,616

[22] Filed: Dec. 24, 1987

[30] Foreign Application Priority Data

Dec. 25, 1986 [JP] Japan ................................ 61-307874

[51] Int. Cl.[4] .............................................. H01J 40/14
[52] U.S. Cl. ............................ 250/214 AL; 356/224
[58] Field of Search ................................ 356/215, 224; 250/214 R, 214 A, 214 AL, 214 SW, 214 P, 206; 354/429

[56] References Cited

U.S. PATENT DOCUMENTS

| | | | |
|---|---|---|---|
| 4,203,668 | 5/1980 | Chapman | 356/215 |
| 4,465,370 | 8/1984 | Yuasa et al. | 356/224 |
| 4,666,301 | 5/1987 | Gruenke | 356/224 |

*Primary Examiner*—David C. Nelms
*Attorney, Agent, or Firm*—Finnegan, Henderson, Farabow, Garrett & Dunner

[57] ABSTRACT

A device for measuring the intensity of light received by a photosensor comprises a photosensor for receiving light and producing a corresponding current and a circuit for integrating the current so that the intensity of the received light is indicated as the time required for the integration value of the integrating circuit to reach a predetermined value. If the intensity of the light is determined to be high at the start of the integration operation the integration value is set to the smaller of two predetermined values. If the intensity of the light is low, the integration value is set to a larger value.

4 Claims, 2 Drawing Sheets

DEVICE FOR MEASURING LIGHT INTENSITY RECEIVED BY A PHOTOSENSOR

FIELD OF THE INVENTION

This invention relates to a device for measuring the intensity of light received by a photosensor which can be used as an exposure meter, a luminance meter or an image sensor.

BACKGROUND OF THE INVENTION

One example of a conventional received light intensity measuring device of this type is shown in FIG. 3. A photosensor 1 (which is made up of a photodiode in this example) is a conversion element that provides a photoelectric current in corresponding to a received light intensity L. A capacitor 2 connected in parallel with the photosensor 1 is discharged when the photoelectric current i flows in the photosensor 1. A signal obtained by integration of the photoelectric current is applied, as a signal $V_1$, to the positive (+) input terminal of a comparator 3. Before the sensing operation, a transistor 4 is temporarily rendered conductive by a reset input so that the capacitor 2 is charged to a level $V_{DD}$. The voltage $V_1$ applied to the comparator 3 can be represented by the following equation (1):

$$V_1 = 1/C \int i\, dt \quad (1)$$

where C is the capacitance of the capacitor 2.

The operation of the circuit shown in FIG. 3 will be described with reference to a time chart shown in FIG. 4. A reset signal as shown in FIG. 4 is applied to the transistor 4 so that the capacitor 2 is charged and $V_1$ is set to zero ($V_1 = $"0"). This causes the output of the comparator 3 to be set to "0". Under this condition, the time interval $t_s$ which elapses from the time instant that discharging the capacitor 2 commences until the output of the comparator 3 is raised to "1"; that is, until the input $V_1$ of the comparator 3 reaches a reference level $V_{ref}$ is measured. The time interval $t_s$ thus measured represents the intensity L of the received light.

If it is assumed that the current i is substantially proportional to the intensity L; that is, i=A L, then the input voltage $V_1$ of the comparator 3 can be represented by the following equation (2):

$$V_1 = A\, L\, t/C \quad (2)$$

The period of time $t_s$ required for $V_1$ to reach $V_{ref}$ was described above. Therefore, the period of time $t_s$ can be obtained from the following equation (3):

$$t_s = C\, V_{ref}/A\, L \quad (3)$$

In the above-described case, the intensity L of the light received changes generally in a wide range. If the maximum value of the intensity of the light received is $10^6$ times as large as the minimum value, then the maximum value of the conversion time $t_s$ is $10^6$ times longer than the minimum value. That is, when the minimum conversion time is one (1) micro-second, the maximum conversion time will be one (1) second. This is not practical. When it is required to shorten the conversion time $t_s$ when the received light intensity L is small, the value $V_{ref}$ should be decreased. However, since the comparator does not work for an input close to the supply voltage ($V^+$ and $V^-$) because of its fundamental characteristic, if the reference voltage $V_{ref}$ is made extremely close to the ground level of the comparator, then the circuit of FIG. 3 will not operate. This difficulty may be eliminated by a method in which a power source is additionally provided for the comparator only and the value $V^-$ is set to a minus potential. However, the method is not applicable to the case where the circuit should have the common ground level in its entirety. Furthermore, in the case where it is possible to set the reference value $V_{ref}$ to a considerably small value, if the value $V_{ref}$ is fixed, then in the case where the received light intensity L is large, the response time $t_s$ is decreased to a point of making it impossible for other circuits to function properly.

SUMMARY OF THE INVENTION

An object of the present invention is to provide a light intensity measuring device that has a wide dynamic range.

Another object of the present invention is to provide a light intensity measuring device that accurately indicates the intensity of received light.

The above and other objects are accomplished by a device for measuring the intensity of light received by a photosensor comprising a photosensor for receiving light and producing an output current corresponding to the intensity of the light received, and integrating means for integrating the output current of the photosensor to indicate the intensity of the light received as a period of time required for the integration value of the integrating means to reach a predetermined value after the start of the integration operation, the integrating means comprises means for determining if the intensity of light received by the photosensor is in a first range or a second range, and means for setting, when the intensity of light is determined to be in the first range, the integration value at the start of the integration operation to a first predetermined value and for setting, when the intensity of light is determined to be in the second range, the integration value to a second predetermined value larger than the first predetermined value.

BRIEF DESCRIPTION OF THE DRAWINGS

The manner by which the above objects and other objects, features and advantages of the invention are attained will be apparent from the following detailed description when read in conjunction with the acompanying drawings, wherein.

DETAILED DESCRIPTION OF THE INVENTION

Figure 1:
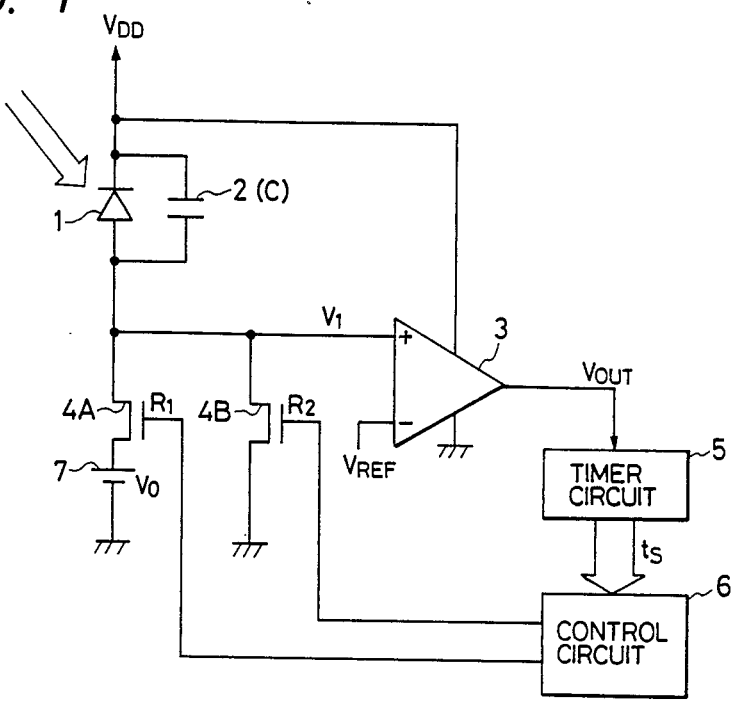
FIG. 1 is a circuit diagram showing one example of the light intensity measuring device according to the present invention.

In FIG. 1, a photosensor 1, e.g., a photodiode, is coupled in parallel with a capacitor 2. A comparator 3 has a positive (+) input terminal connected to reset transistors 4A and 4B. A timer circuit 5 measures a conversion time $t_s$ and a control circuit 6 controls the reset timing of the reset transistors 4A and 4B. A source 7 of constant voltage $V_0$ is connected to the reset transistor 4A.

Figure 2:
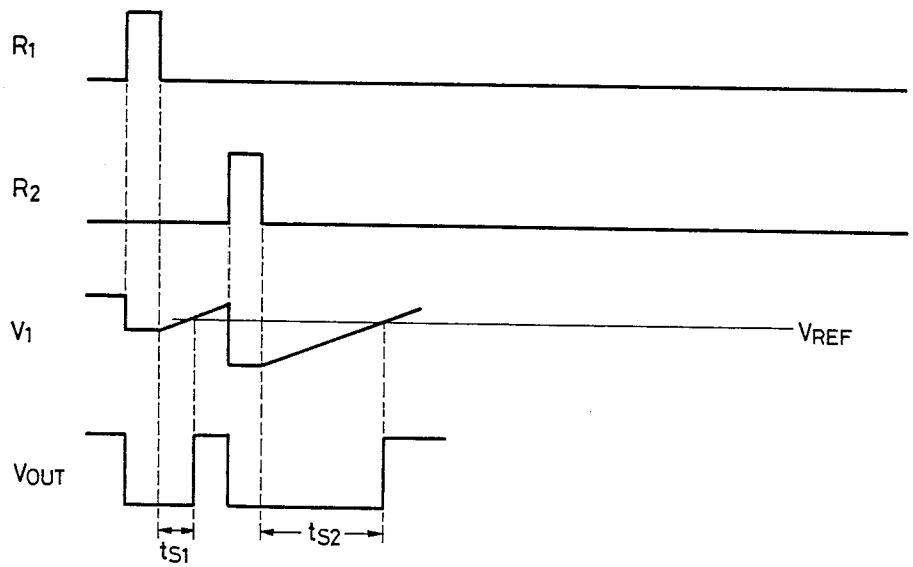
FIG. 2 is a time chart for a description of the operation of the measuring device shown in FIG. 1.
Figure 3:
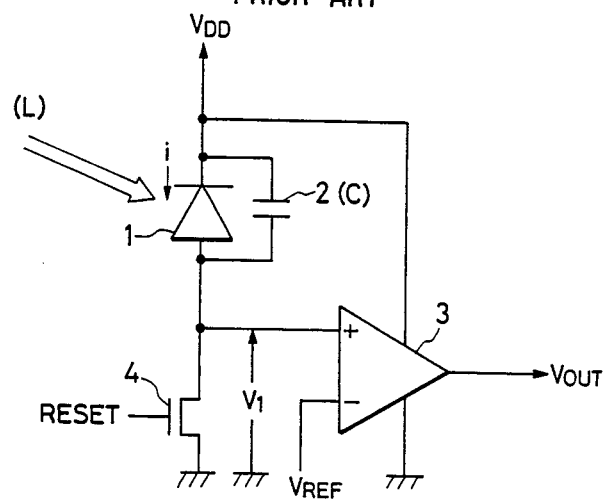
FIG. 3 is a circuit diagram showing one example of a conventional light intensity measuring device.
Figure 4:
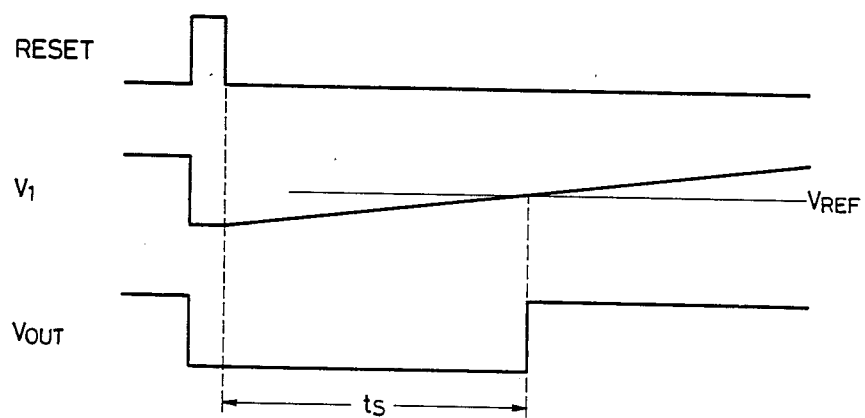
FIG. 4 is a time chart for a description of the operation of the device shown in FIG. 3.

The control circuit 6 outputs a signal $R_1$, as shown in FIG. 2, to render the transistor 4A conductive. As a result, a voltage $V_1$ is applied to the positive (+) input terminal of the comparator 3 at a level equal to the potential $V_0$ of the constant voltage source 7. Thus, the integrating operation of the capacitor 2 is started beginning with the initial value $V_0$. If the value $V_0$ is set within an input range for which the comparator 3 operates normally, the reference value $V_{ref}$ applied to the negative (−) input terminal of the comparator 3 can be made sufficiently close to the value $V_0$. Accordingly, even when the received light intensity L is relatively small, as shown in FIG. 2, the conversion time $t_{sl}$ required for the input $V_1$ of the comparator 3 to reach the reference value $V_{ref}$ can be made sufficiently short. The conversion time is measured by the timer circuit 5 comprising, for instance, a counter, and is applied to the control circuit 6.

When, on the other hand, the received light intensity L is larger than a certain value, the conversion time $t_s$ is so short that is cannot be accommodated by the measurement accuracy of the timer circuit 5. In this case, a reset signal $R_2$ shown in FIG. 2 is applied to the reset transistor 4B to render the transistor 4B conductive, as a result of which the signal $V_1$ is set to ground potential.

The determination of the received light intensity L; i.e., the determination of whether or not the reset transistor 4B is to be turned on, is carried out as follows. In the control circuit 6, the conversion time $t_{sl}$ measured by the timer circuit 5 is compared with a predetermined value $t_0$. When $t_{sl} < t_0$ (or $t_{sl} \leq t_0$), the reset transistor 4B is rendered conductive. When the signal $V_1$ is set to zero (0) potential by means of the reset transistor 4B, then it is somewhat different from the reference value $V_{ref}$, and therefore even if the received light intensity L is large, the conversion time can be measured with high accuracy.

In the above-described embodiment, the conversion time is measured twice; that is, two conversion times $t_{sl}$ and $t_{s2}$ are measured. However, since the measurement of conversion time is repeated only when the conversion time $t_s$ is short, the difficulty that the sum of the two conversion times measured is excessively long will not occur.

In the above-described embodiment, the operation is started with the large integration value; however, it goes without saying that it can be started with the small integration value.

In case a plurality of photosensors are arranged in an array, a typical conversion time such as the average of the shortest and the longest conversion times may be used to determine whether or not the reset transistor 4B should be operated.

Instead of the photosensor array, means for determining a received light intensity average in advance may be employed in such a manner that the reset transistor 4A and 4B are selectively rendered conductive (the transistor 4A is rendered conductive when the received light intensity is small) according to the output of the determining means. In this case, unlike the case of FIGS. 1 and 2 in which the conversion time is measured twice, the measurement of the conversion time need be performed only once.

As is apparent from the above description, in the device of the present invention for measuring the intensity of the light received by a photosensor, at the start of the integration operation the initial value is changed according to the received light intensity. When the received light intensity is small, the integration time of the photoelectric current, i.e., the conversion time thereof, can be made short. In the case when the received light intensity is large, the conversion time can be long. Thus, the received light intensity measuring device of the invention has a wide dynamic range.

What is claimed is:

1. A device for measuring the intensity of light received by a photosensor, comprising:
a photosensor for receiving light and producing a photocurrent corresponding to the intensity of light received;
integrating means for integrating said photocurrent over an integration time interval to produce an output voltage, said integrating means being set at a first initial integration voltage when said intensity of light received is in a first range, and at a second initial integration voltage when said intensity of light received is in a second range; and
comparing means for comparing said output voltage with a predetermined value and for outputting said output voltage when said output voltage reaches said predetermined value at the end of said integration time interval, said intensity of light received being measured as a function of said integration time interval.

2. A device according to claim 1, further comprising means for selecting said second initial integration voltage at the start of said integration time interval, and for selecting said first initial integration voltage when said output voltage is less than said predetermined value.

3. A device according to claim 2, further comprising a counter for counting said integration time interval, the value of said counter corresponding to said intensity of light received when said output voltage reaches said predetermined value.

4. A device according to claim 3, further comprising a control circuit for outputting a first signal when the intensity of light received is in said first range and a second signal when the intensity of light received is in said second range, a first transistor for connecting said integrating means to a first source of initial input potential in response to said first signal and a second transistor for connecting said integrating means to a second source of initial input potential in response to said second signal.

* * * * *